Patented Feb. 9, 1932

1,844,754

UNITED STATES PATENT OFFICE

ROBERT GELLER, OF KARLSRUHE, BADEN, GERMANY

MANUFACTURE OF SOLID ALCOHOLS

No Drawing. Application filed May 8, 1929, Serial No. 361,538, and in Germany December 20, 1926.

This invention relates to a process for the manufacture of solid alcohols.

The solidifying of alcohol or alcoholic solutions, such, for example, as are required for the manufacture of solid spirit, cosmetic preparations and solid iodine solutions, has hitherto preferably been performed by adding soaps to the alcohol. Solid alcohols of this kind, however, tend to liquefy at relatively low temperatures, so that the same are not durable, for example, in tropical countries. The soaps employed, particularly if these are obtained from natural fats and oils, are moreover capable of offering very little resistance to chemical action, so that alcohol solidified in the manner indicated is not readily adapted to act as carrier for certain additional constituents, as the soaps react with these substances, losing on the one hand their solidifying properties, and on the other hand rendering the additional substances ineffective.

It is the primary object of the present invention to overcome the disadvantages referred to, and this is accomplished by employing the alkali salts of aromatic acids for solidifying the alcohol.

Other objects and advantages of the invention will become apparent as the description proceeds.

In carrying my invention into practice I have discovered that the sodium salts of benzoic acid, salicylic acid and phthalic acid, employed either singly or in mixture, are particularly suitable for the purpose in question. The salts referred to may be stirred in direct manner into the preferably hot alcoholic solution, and the mixture allowed to set. In lieu of the actual salts it is possible to add with advantage to the alcoholic solution the components which react together and form the salts. Particularly suitable components are on the one hand the alkali metals, in the form of alcoholates, or the hydroxides of alkali metals, and on the other hand pure aromatic acids or their anhydrides and esters. The extent of solidifiation of the solid alcohol thus obtained may on the one hand be decreased by the addition of the known soaps, or on the other hand very considerably increased by the slight addition of cellulose ethers, more particularly trimethylcellulose or dimethylcellulose. The latter substances distinguish themselves by particular stability in the face of chemical action.

The solidifying and hardening process according to the present invention may be used for all purposes in which solid alcohols are required; e. g., in the preparation of solid alcohol compositions for burning purposes, for cosmetic and therapeutic purposes, and the like. Due to their great stability from a mechanical and chemical aspect these solid alcohols are particularly suitable for the manufacture of solid alcoholic iodine solutions, such as required for chemical-technical and pharmaceutical purposes. The particular addition of chemical stabilizers for the elementary iodine, such for example as iodides, is in this case no longer essential. In many cases, however, the addition of these substances will facilitate the production.

In order to suppress the iodoform formation occurring in the course of time from the iodine and the alcohol, excess free acid, for example one of the aromatic acids referred to or also an aliphatic acid, is added to the mixture.

The following examples are quoted in order to show exactly how the invention may be employed in practice:

*1*

To 1000 cubic centimeters of an approximately 12% alcoholic solution of benzoic acid at a temperature of roughly 65° C. are added approximately 500 cubic centimeters of alcohol, in which have been dissolved 20 grams of sodium metal. The mixture is poured into molds of any desired kind and allowed to set. The mass then solidifies to form a solid alcohol of remarkable hardness. In lieu of the components it is also possible to dissolve in the warm alcoholic solution the equivalent amount of sodium benzoate.

*II*

In 1000 cubic centimeters of alcohol are dissolved approximately 140 grams of a mixture comprising benzoic acid, salicylic acid and phthalic acid in equal parts, and to the hot solution is added such an amount of alcoholic caustic soda solution that the acids are exactly neutralized. After cooling the mass solidifies to form a solid substance.

III

To the mixtures formed in accordance with Examples I and II are added approximately 100 cubic centimeters of a 1% solution of trimethylcellulose. After the solidifying a solid mass of increased hardness results.

IV 122 grams of benzoic acid are dissolved in 1000 cubic centimeters of alcohol, and to this solution, the same having been heated to approximately 65° C., are added 500 cubic centimeters of alcohol in which have been dissolved 20 grams of sodium metal. To the mixture thus obtained are added 101.5 grams of sublimated iodine, the mixture then being poured into molds and allowed to cool. An iodine solution is thus obtained, which is capable of being applied without a brush, and which remains solid even with increased temperature of the surrounding atmosphere.

V

The ingredients in this case consists of 1200 grams of alcohol, 180 grams of neutral soap, and 60 grams of stearic acid. To this mixture are added 144 grams of iodine, and the mixture poured into molds and allowed to cool. The solidified mass does not show any decrease of its free iodine content even after several months, and retains its solid consistency. The neutral soap may be substituted, either wholly or in part by sodium benzoate, salicylate or phthalate. In this case the hardness of the solid iodine solution is increased. This increase in hardness may be accentuated by employing no soap at all, but merely the sodium salts alone or with the slight addition of trimethylcellulose.

It will be understood that no restriction is made to the exact examples given, or to the particular substances or proportions referred to, but the various modifications may be made without departing from the spirit of the invention.

What I claim as new and desire to secure by Letters Patent is:

1. Process for the manufacture of solid alcohols, which comprises incorporating in the alcohol in hot state alkali metal salts of aromatic carboxylic acids, and cooling the resulting mixtures.

2. Process for the manufacture of solid alcohols, which comprises incorporating in hot alcohol solutions sodium salts of aromatic carboxylic acids of the group consisting of benzoic acid, salicylic acid and phthalic acid, and cooling the resulting mixtures.

3. Process for the manufacture of solid alcohols, which comprises incorporating in the hot alcohol solutions the sodium salt of an aromatic carboxylic acid of the group consisting of benzoic acid, salicylic acid, and phthalic acid, and cooling the resulting mixtures.

4. Process for the manufacture of solid alcohols, which comprises incorporating in a hot alcohol solution the sodium salt of benzoic acid, and cooling the resulting mixture.

5. Process for the manufacture of solid alcohols, which comprises dissolving in the hot alcoholic solutions free aromatic carboxylic acids, then adding alcoholic solutions of the alkali metal hydroxides, and cooling the resulting mixtures.

6. Process for the manufacture of solid alcohols, which comprises incorporating in hot alcoholic solutions alkali metal salts of aromatic carboxylic acids, together with fatty acid salts, and cooling the resulting mixtures.

7. Process for the manufacture of solid alcohols, which comprises incorporating in hot alcoholic solutions alkali metal salts of aromatic carboxylic acids, together with a cellulose ether, and cooling the resulting mixtures.

8. Process for the manufacture of solid alcohols, which comprises incorporating in hot alcoholic solutions alkali metal salts of aromatic carboxylic acids, together with trimethylcellulose, and cooling the resulting mixtures.

9. Process for the manufacture of solid alcohol solutions, which comprises incorporating in hot alcoholic solutions alkali metal salts of aromatic carboxylic acids together with a solid free fatty acid, and cooling the resulting mixtures.

10. Process for the manufacture of solid alcoholic solutions, which comprises incorporating in hot alcoholic solutions alkali metal salts of aromatic carboxylic acids together with stearic acid, and cooling the resulting mixtures.

11. Process for the manufacture of solid alcoholic solutions, which comprises incorporating in hot alcoholic solutions iodine and alkali metal salts of aromatic carboxylic acids together with a solid free fatty acid, and cooling the resulting mixtures.

12. Process for the manufacture of solid alcoholic solutions, which comprises incorporating in hot alcoholic solutions iodine and alkali metal salts of aromatic carboxylic acids together with stearic acid, and cooling the resulting mixtures.

In testimony whereof, I affix my signature.

ROBERT GELLER.